United States Patent [19]
Sakurai et al.

[11] Patent Number: 5,363,229
[45] Date of Patent: Nov. 8, 1994

[54] OPTICAL BUS TRANSMISSION SYSTEM

[75] Inventors: Tutomu Sakurai, Ikoma; Takeshi Yamakita, Suita, both of Japan

[73] Assignee: Matsushita Electrical Industrial Co., Ltd., Osaka, Japan

[21] Appl. No.: 798,600

[22] Filed: Nov. 26, 1991

[30] Foreign Application Priority Data

Nov. 26, 1990 [JP] Japan ................................. 2-325028

[51] Int. Cl.⁵ ................................................ H04B 10/10
[52] U.S. Cl. ................................. 359/159; 359/165; 359/167; 359/158; 359/137
[58] Field of Search ................. 359/135–137, 359/140, 113, 158, 159, 161, 165, 167, 152, 153, 118; 370/92, 94.2

[56] References Cited

U.S. PATENT DOCUMENTS

| | | | |
|---|---|---|---|
| 4,470,154 | 9/1984 | Yano | 359/165 |
| 4,717,913 | 1/1988 | Elger | 359/172 |
| 4,720,827 | 8/1988 | Kanaji | 359/137 |
| 4,727,600 | 2/1988 | Avakian | 359/172 |
| 4,796,301 | 1/1989 | Uzawa | 359/165 |
| 4,855,729 | 8/1989 | Takeuchi | 359/165 |
| 4,867,560 | 9/1989 | Kunitsugu | 359/172 |
| 4,933,928 | 6/1990 | Grant | 359/172 |
| 4,941,206 | 7/1990 | Sakurai | 359/158 |
| 5,119,222 | 6/1992 | Hara | 359/165 |

FOREIGN PATENT DOCUMENTS 0202602 11/1986 European Pat. Off. ............ 359/167

Primary Examiner—Leslie Pascal
Attorney, Agent, or Firm—Wenderoth, Lind & Ponack

[57] ABSTRACT

An optical bus transmission system wherein, even in the presence of an obstacle, a stable transmission is ensured if a plurality of transceivers are provided in the home station, or, if the subsidiary stations are equipped with a relay function and the transmission time is controlled to generate a vacant transmission time among the subsidiary stations, a more stable transmission is achieved, and, if the level of the light of the subsidiary stations is arranged to be controlled by the command information from the home station, the transmission becomes stable even when a obstacle is present.

6 Claims, 9 Drawing Sheets

Fig. 2
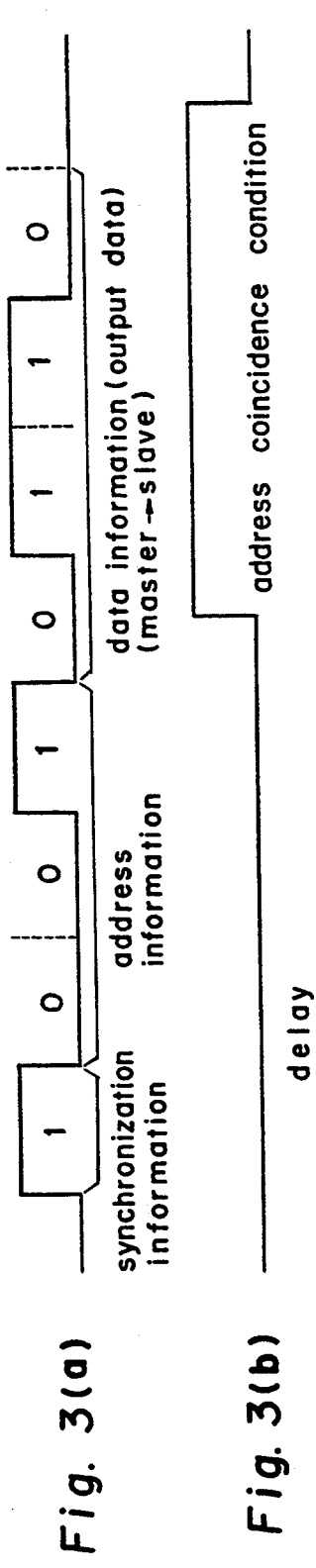
Fig. 3(a)
Fig. 3(b)
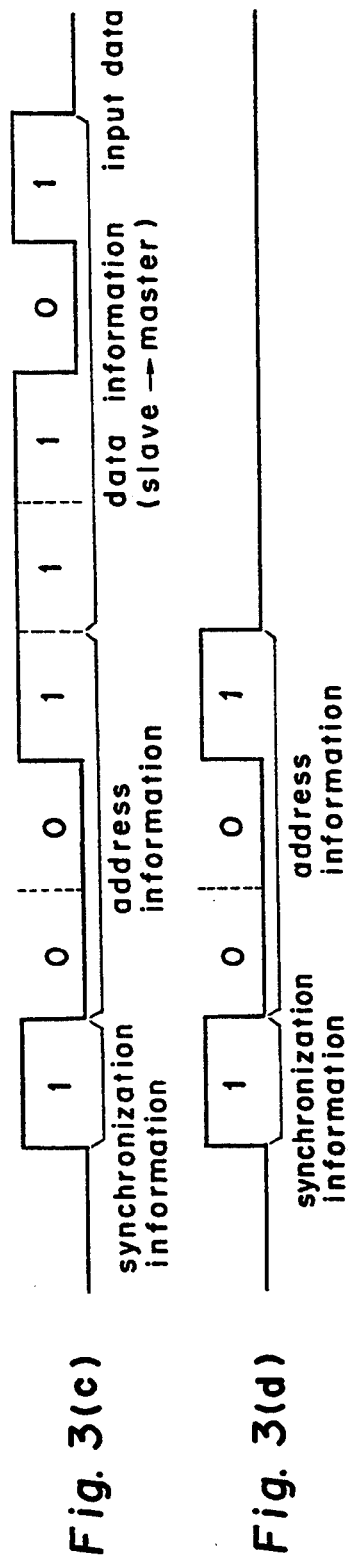
Fig. 3(c)
Fig. 3(d)

13····beam splitter

OPTICAL BUS TRANSMISSION SYSTEM

BACKGROUND OF THE INVENTION

1. Field of the Invention

The present invention relates to a transmission system for performing optical spatial transmission or optical bus transmission in an arrangement for office automation or local area networks, and other kinds of equipment.

2. Description of the Prior Art

The inventors of the present invention have proposed before a data transmission device in Japanese Patent Application SHO 61-165830, wherein, as shown in FIG. 15, a controller 61, used as a master station, is connected to slave stations 62 which are input/output units to a sensor or an actuator via an optical fiber or the like in a manner to assume a loop.

On the other hand, Japanese Laid-open Patent Publication SHO 59-95746 has disclosed an arrangement for spatial optical transmission. The arrangement not only enables bilateral transmission, but realizes transmission of one-to-many signals between the home and slave stations in a wide area, with considerations given to interference between many communication stations. As shown in FIG. 16, according to the disclosed arrangement, a plurality of non-directive optical transceivers 66 are connected to a ceiling 65 or a wall in the station yard, etc. via a wire cable 67. Each terminal device is provided with a directive optical transceiver 68 which is communicable with one of the non-directive optical transceivers 66, so that the transmission data added to an address data of the subject party is transmitted to the non-directive optical transceiver 66 from the directive optical transceiver 68. The data is then transmitted from all of the non-directive optical transceivers 66 to the corresponding directive optical transceivers 68. Each terminal device identifies the address data contained in the transmission data so as to thereby read the transmission data.

In the former arrangement, namely, in a loop optical transmission device having a master station 61 and slave stations 62 directly connected in series by means of one optical transmission path 63, wiring of an optical fiber or the like is not avoidable, and therefore it causes an increase of costs if the layout should be changed frequently or the arrangement cannot be employed at all if the circumstances can not afford the use of optical fiber. Moreover, the usage of the optical fiber is limited in a movable part, etc. in order to prevent the deterioration of the optical fiber.

According to the latter method revealed in Japanese Laid-open Patent Publication SHO 59-95746, since spatial optical transmission is applied to the method, the above-described disadvantages are not brought about. However, it takes a lot of time to adjust for the collision of data, thereby losing accessibility of data in real time. Further, a complete wiring-free arrangement is difficult because of the necessity of a cable.

SUMMARY OF THE INVENTION

The object of the present invention is therefore to provide an optical bus transmission system, with an aim to solve the above disadvantages inherent in the prior art arrangement of the loop optical transmission by use of the optical bus transmission, which operates stably in real time without generating a collision of data or the like.

In order to achieve the aforementioned object, in an optical bus transmission system according to the present invention, a master station is provided with a means for generating an optical serial signal in the transmission format comprising a synchronizing signal, address information and data information, and each of a plurality of slave stations connected to the master station via an optical bus is provided with: a means for parallel-converting the optical serial signal from the master station, a means for serial-converting the input data information, a detecting means for detecting the coincidence of a slave station address set therein beforehand and the address information from the optical series signal, a transmitting means for transmitting the received optical series signal in accordance with the transmission format, and a switching means for switching the transmitting means so that the input data information is transmitted as the data information in the transmission format when the addresses are agree with each other, whereas at least the data information is not transmitted when the addresses are not coincident. When the addresses are not the same, it may be possible not to generate a signal at all.

For a concrete example of the transmitting method between the master station and slave stations, there may be provided transceiver means in the master station for transmitting an optical signal on a predetermined optical axis, with beam splitters arranged on the optical axis to transmit the optical signal to each slave station. A plurality of optical transceiver means may be provided in the master station.

The data information in the transmission format may be divided into an output data part and an input data part. When the addresses are coincident, the input data information is transmitted as the input data part of the data information in the transmission format. On the other hand, when the addresses are not coincident with each other, the transmitting means may be switched by the switching means to transmit the receiving signal. At the same time, the optical transmission time may be controlled to generate a transmission vacant time among the slave stations or each slave station may be equipped with a relay function. A means may be further included in the optical bus transmission system of the present invention for using the data information in the transmission format as a command data part a or a status data part, transmitting means for transmitting the level of the received amount of light as status information to the master station, and a controlling means for controlling the level of the receiving/transmitting amount of light using command information from the master station.

It is further desirable to provide an emitting/receiving means of the optical signal and an emitting means of a visible light to generate the optical signal and visible light in a manner to keep the optical axes in parallel.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a diagram of a basic transmission format;

FIGS. 3(a)-3(d) together form is an operating timing chart;

FIGS. 12(a)-12(d) are diagrams is a diagram of a transmission format employed in the third embodiment;

DETAILED DESCRIPTION OF THE PREFERRED EMBODIMENTS

Preferred embodiments of the present invention will be described hereinbelow with reference to FIGS. 1-14.

Figure 1:
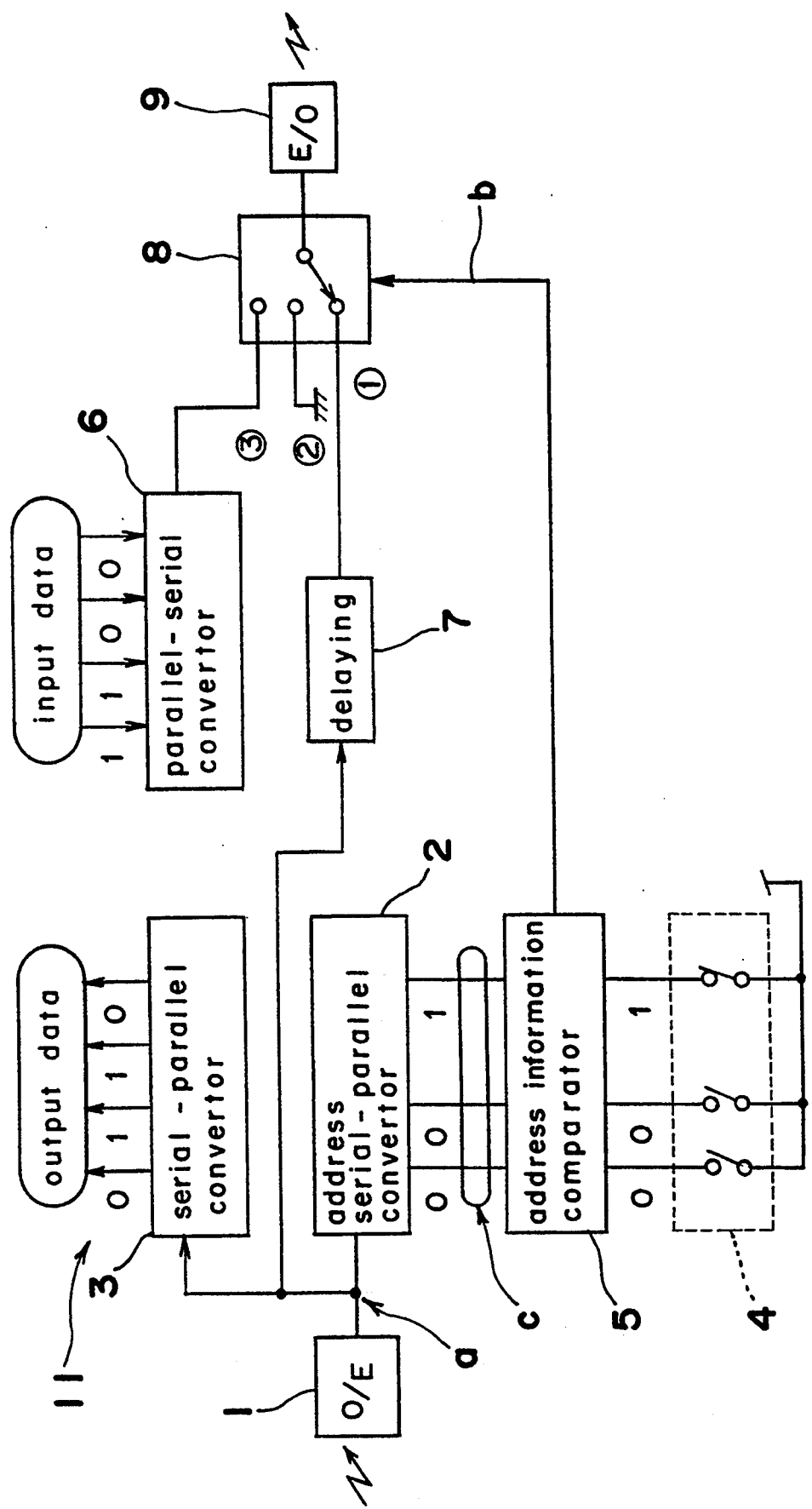
FIG. 1 is a structural block diagram of a slave station of a first embodiment of the present invention.

FIG. 1 shows the structure of a slave station of an optical spatial transmission system according to a first embodiment of the present invention. The transmission format of the system is indicated in FIG. 2. The slave station is provided with an opto-electric converter 1 for receiving and converting optical signals, a serial-parallel converter 2 for an address part and a serial-parallel converter 3 for a data part, so that a serial optical signal from a master station which assumes the transmission format shown in FIG. 2 is photoelectrically converted to parallel address information and parallel data information. Moreover, the slave station includes an address setting switch 4 to set the address of the slave station and an address information comparator 5 which compares the address set in the switch 4 with a parallel-converted address information to find a coincidence therebetween. If the addresses are detected to be coincident with each other by the comparator 5, a transmission change-over switch 8 is switched to the side of a terminal (3) to connect the input data to a parallel-serial converter 6 for a data part. On the other hand, if the addresses do not agree with each other, the change-over switch 8 is switched to the side of a terminal (2) to be grounded. It is to be noted here that the transmission change-over switch 8 is switched to a terminal (1) and connected to a delay circuit 7 during the comparison of the addresses. An output terminal of the switch 8 is connected to an electro-optic converter 9 for converting and transmitting purposes.

The operation of the slave station in the above-described structure will be discussed with reference to the signal waveforms of FIGS. 3(a)-3(d). A received optical signal a which is changed to an electrical signal by the opto-electric converter 1 is delayed by the delay circuit 7 so much as not to induce disturbances when the switch 8 is changed over, passing through the terminal (1), and converted to an optical signal by the electro-optic converter 9. Meanwhile, the receiving signal a is converted to parallel address information c by the serial-parallel converter 2, the address of which is compared with the address set by the switch 4 in the address information comparator 5. If the addresses are not coincident, the change-over switch 8 is switched to the terminal (2). The resultant signal to be transmitted is a signal without data information as shown in FIG. 3(d). On the other hand, if the addresses are coincident, the change-over switch 8 is switched to the terminal (3), and the data information is replaced with the data obtained by converting the parallel input data into serial data by the parallel-serial converter 6. The signal waveform at this time has the same synchronizing information and address information as that of the signal sent from the master station, but the data information alone is replaced, as indicated in FIG. 3(c).

Figure 4:
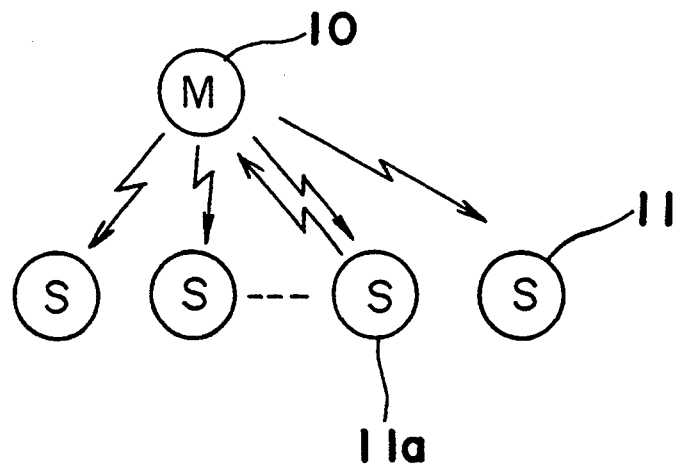
FIG. 4 is a diagram explanatory of a first communicating state.
Figure 5:
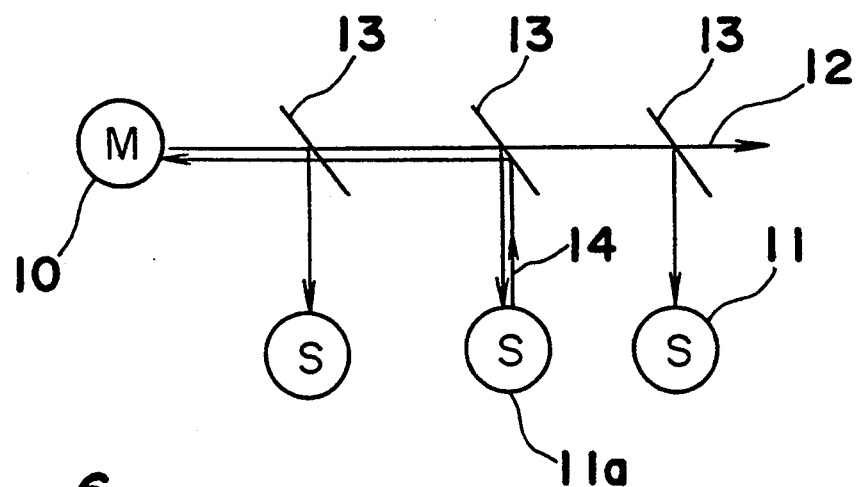
FIG. 5 is a diagram explanatory of a second communicating state.
Figure 6:
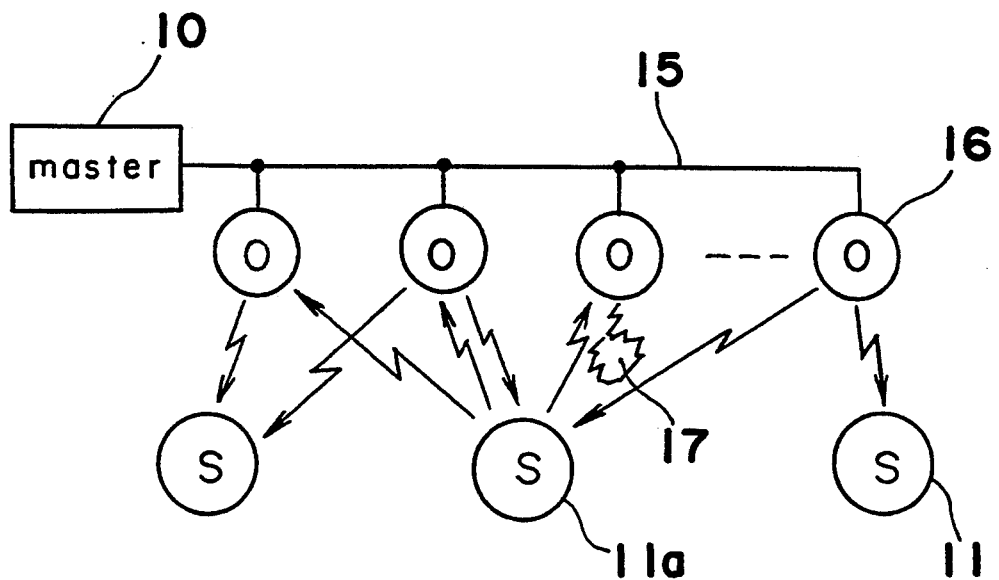
FIG. 6 is a diagram explanatory of a third communicating state.

The slave stations and master station communicate in various types of states as illustrated in FIGS. 4-6. The communicating state shown in FIG. 4 is most basic, wherein the master station 10 transmits the same signal to all of the slave stations 11 with the same timing. With respect to the slave stations 11, only an accessed slave station 11a sends the data information back. Therefore, as long as there is no duplication of addresses among the slave stations 11, the signal of the waveform as shown in FIG. 3(c) is transmitted from the accessed slave station 11a to the master station 10, whereby the master station 10 receives the signal without interference from the other slave stations 11. Therefore, the communicating state of FIG. 4 realizes a more stable communication.

In the communicating state of FIG. 4, the light output from the master station 10 must be many scattered beams of light, and therefore, although the communicating state of FIG. 4 is suitable for use in short distance communication, it is not appropriate to communicate with trucks running on the same straight rail or when the master station is several hundreds or several thousands meters away from the slave stations. In such case as above, the communicating state shown in FIG. 5 is preferable.

According to the communicating state of FIG. 5, a transmission light 12 from the master station 10 is one parallel luminous flux and is diverged by beam splitters 13 towards the slave stations 11. Each slave station 11 is adapted to transmit the light in the same direction of the optical axis as the receiving direction.

The transmission light 12 from the master station 10 is divided into each slave station 11 by beam splitters 13. A proper address is assigned to each slave station 11 beforehand. Therefore, only the slave station 11a having the same address as that of the address information of the receiving signal transmits data information 14 in the same or parallel direction as that of the receiving light. The light of the data information 14 is returned to the master station 10 along the optical axis of the transmission light 12 by the beam splitter 13. Since the data information is never returned from the other slave stations 11 whose addresses do not agree with the address of the data information, it is possible to receive the signal of the waveform as shown in FIG. 3(c) stably without being disturbed.

The communicating state of FIG. 5 is effective for long distance communication with no obstructions in the way. However, in encountering obstacles, the communicating state of FIG. 6 may be desirable.

In FIG. 6, the master station 10 is connected to a plurality of optical transceivers 16 via an optical fiber 15 or an electrical wire. The light is transmitted in various directions from the optical transceivers 16, that is, the light is scattered by the optical transceivers 16 and, received or sent back by the slave stations 11 in all directions.

The transmission signal from the master station 10 is, through the optical fiber 15, sent to the optical transceivers 16. Each optical transceiver 16 generates the signal in the form of the scattering light. Since the slave stations 11 have respective proper addresses set beforehand as in the foregoing communicating state of FIG. 5, only the slave station 11a whose address agrees with that of the address information in the scattering light receives and transmits the input data information again in the form of the scattering light. This optical signal from the slave station 11a is received by one to several optical transceivers 16 with the same timing. If the addresses of the slave stations 11 are not duplicated, the data information is not returned from the slave stations 11 without the coincidence of the addresses. As a result, the signal without disturbances as indicated in FIG. 3(c) is returned to the master station 10, thus achieving a stable communication. Moreover, even if there is an obstacle 17 between the transceiver 16 and master station 10, a correct communication is assured owing to the provision of a plurality of optical transceivers 16 and the dispersion of the transmission signal.

The communicating state of FIG. 6 costs too much in some cases since the optical fiber 15 or the like is necessitated and a plurality of optical transceivers 16 are required. Therefore, a modified approach may be made to solve the above disadvantage, which will be described below with reference to FIGS. 7–10.

Figure 10:
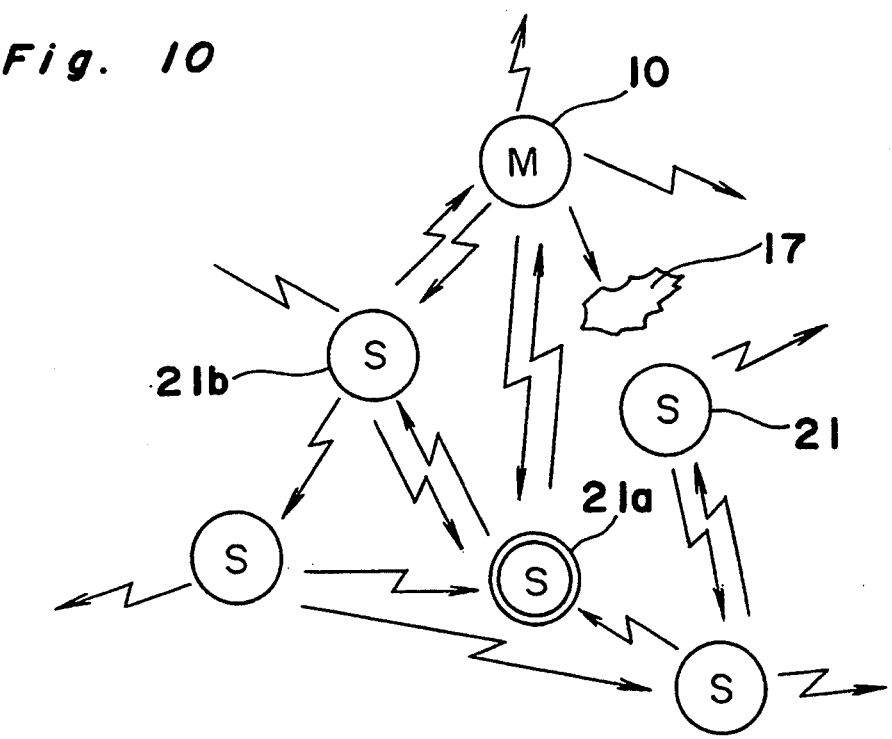
FIG. 10 is a diagram explanatory of a fourth communicating state to which the second embodiment is applied.

FIG. 10 indicates the communicating state which uses slave stations 21 each having a relay function and provided at any optional position with respect to one master station 10, more specifically, to one optical transceiver.

The operation according to the communicating state of FIG. 10 is as follows. A signal of the scattering light generated from the master station 10 first reaches slave stations 21a and 21b. The slave stations 21a and 21b amplify the receiving signal as is and generate the scattering light. Therefore, the signal from the one master station 10 is multiplied and spread geometrically. Each slave station 21 has its own address as in the foregoing embodiment, and the slave station 21a alone which has an address which agrees with that of the address information in the signal transmits the input data as the scattering light. The scattering light including the input data from the slave station 21a is also increased multiple times through the other relay stations and finally reaches the master station 10.

Meanwhile, as the optical signal is increased and spread through the slave stations 21, the signal is delayed, resulting in many delayed light signal generated in the slave stations. Therefore, once the slave station 21 receives the light, the light is continuously increased geometrically without a stop.

For solving the above problem, according to the instant embodiment, such an optical transmission signal is used that is turned ON, supposing that an information 1 is represented by ON and an information 0 is represented by OFF and in the case of the transmission of the information 1, for a preset pulse width which is smaller than the transmission time of a one-bit information so that the optical output is kept OFF until the remaining ON light is completely extinguished.

Figure 7:
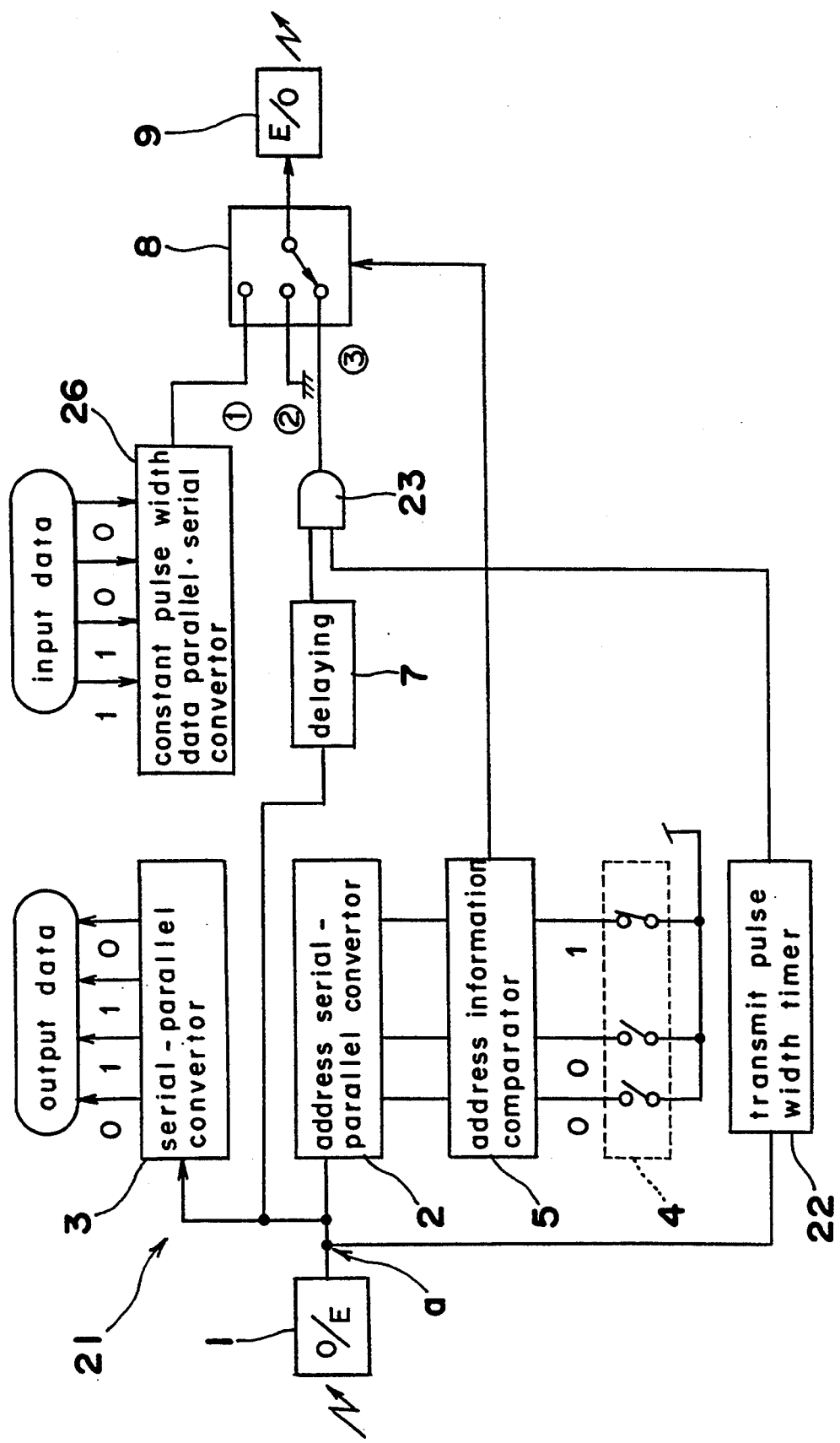
FIG. 7 is a structural block diagram of a slave station of a second embodiment of the present invention.
Figure 8:
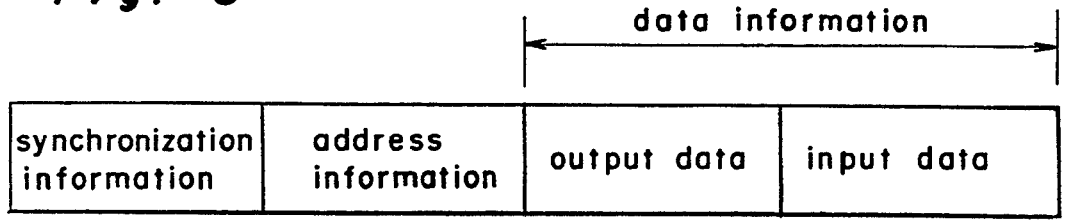
FIG. 8 is a diagram of a transmission format employed in the second embodiment.
Figure 9:
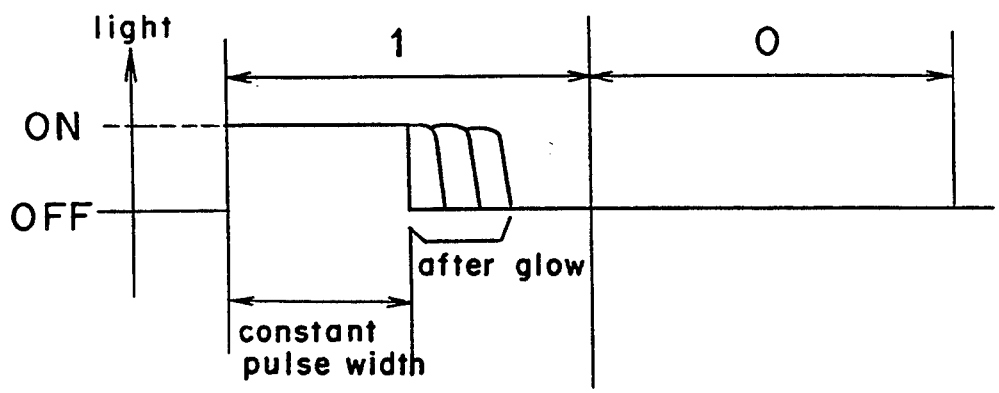
FIG. 9 is a waveform of an optical signal in the second embodiment.

FIG. 7 shows the structure of the slave station 21 applicable to the communicating state of FIG. 10. The transmission format of the present embodiment is shown in FIG. 8, in which the data information is divided into an output data part and an input data part. The structural differences of the slave station 21 from the station 11 of the embodiment shown in FIG. 1 are (a) to switch the change-over switch 8 to the terminal (1) for the input data in the data information when the addresses are coincident, whereas holding the switch 8 in the state changed to the terminal (3) when the addresses are not coincident; (b) to provide a transmission pulse width timer 22 for restricting the pulse width of one ON time when the receiving signal a is transmitted from the electro-optic converter 9 as a transmission signal again, so that the ON time is prevented by a gate 23 from being extended a predetermined time or longer; and (c) to substitute a constant pulse width data parallel-serial converter 26 for the parallel-serial converter 6 in order to transmit the data information in the form of an optical signal when the addresses are found coincident. Since the other points in the structure are the same as in FIG. 1, the description thereof has been abbreviated here. According to the above-described constitution, the signal is transmitted by the multiplied scattering light in space stably even in the presence of an obstacle or even when the obstacle or slave stations are moved.

In the meantime, the received amount of light by the opto-electric converter is naturally limited in the case of the optical transmission. Therefore, if there is an obstacle to the optical transmission, the received amount exceeds the limit, hindering the normal transmission. Moreover, unnecessarily high power is required to raise the S/N ratio to achieve a stable optical transmission. This is not only a waste of electrical power, but develops a heavy drag on the formation of a complete wiring-free system without even a source line, to say nothing of signal lines. As such, it is desirable to provide the optical transmission system with a self-adjustment function so as to keep the received amount of light of all of the slave stations within a predetermined level.

Figure 11:
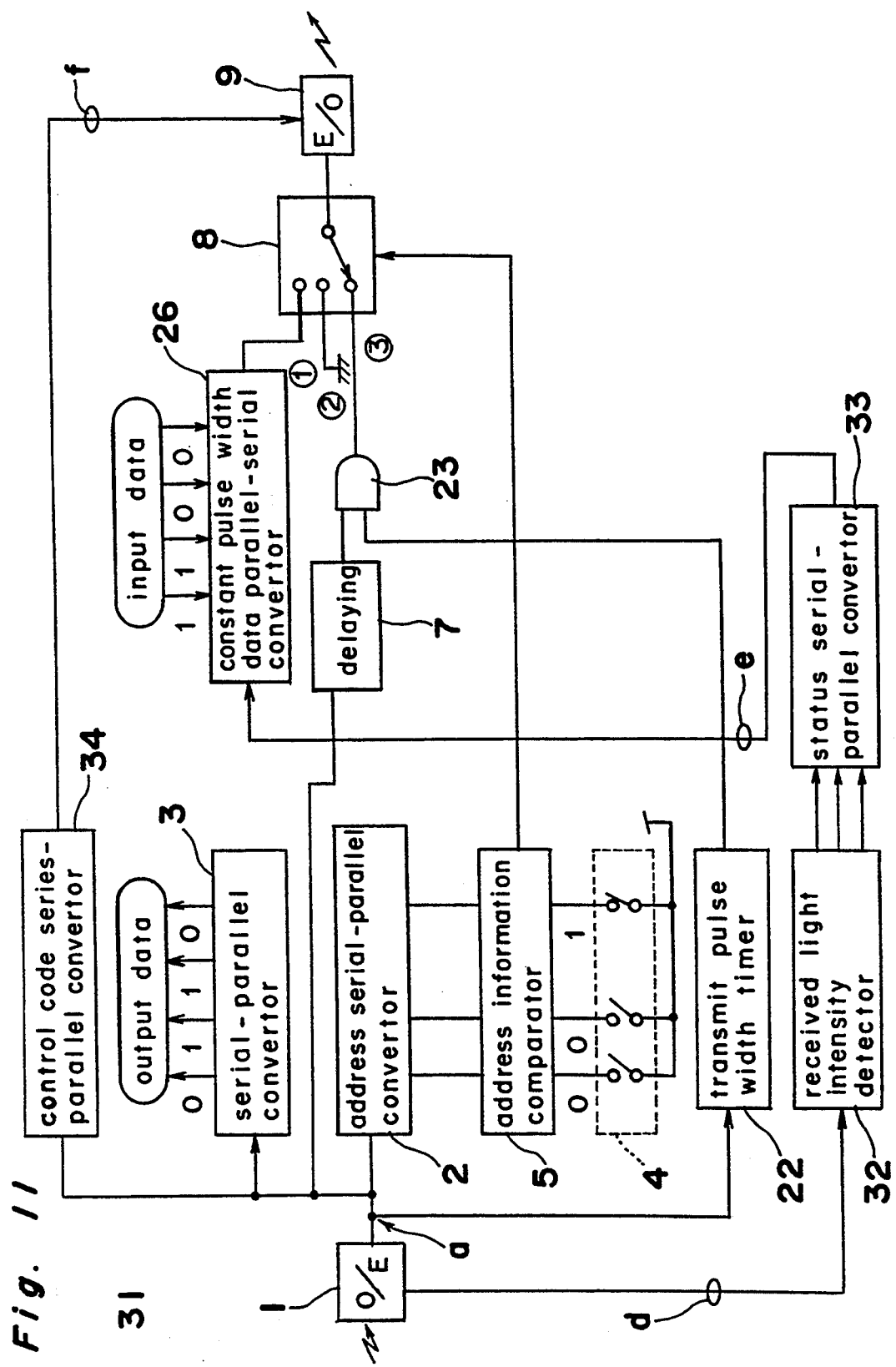
FIG. 11 is a structural block diagram of a slave station of a third embodiment of the present invention.
Figure 12A:
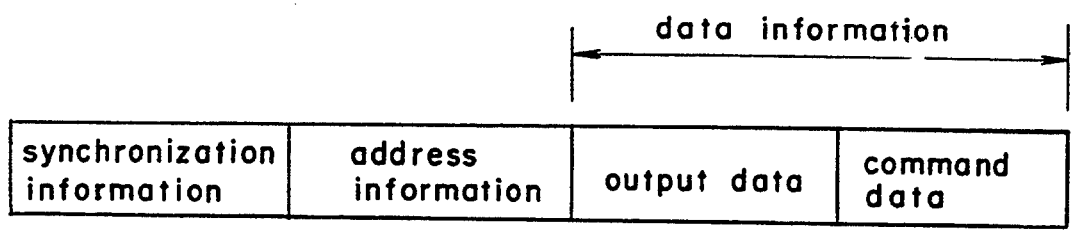
Figure 12B:
Figure 13:
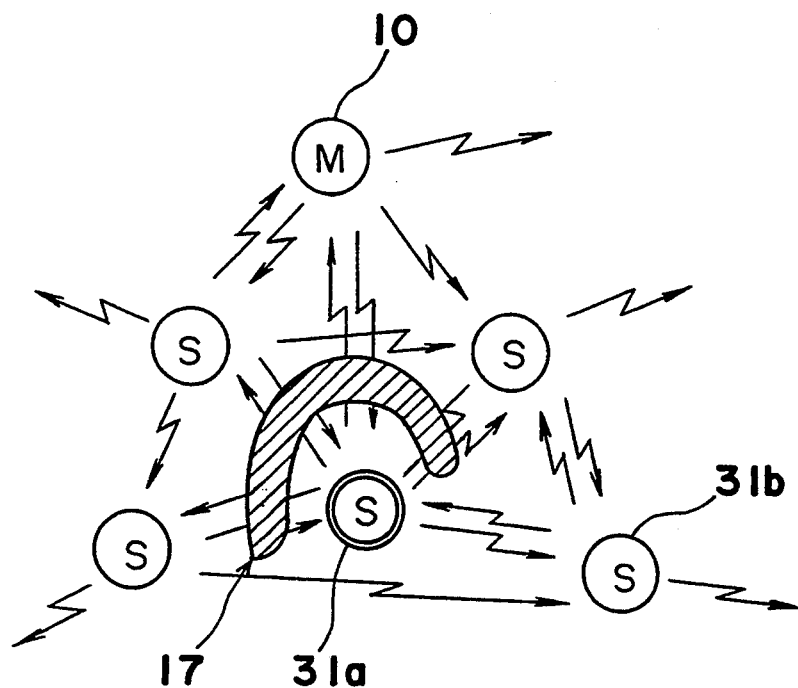
FIG. 13 is a diagram explanatory of a fifth communicating state to which the third embodiment is applied.

The structure of a slave station 31 according to a third embodiment is illustrated in FIG. 11, and the transmission format and communicating state thereof are shown in FIGS. 12(a)–12(b) and 13, respectively. The transmission format of the present embodiment is different from the basic format of FIG. 2 in that the data information is divided into input/output data and command/status data. FIG. 12(a) shows the transmission format of the master station, wherein the data information is allotted as output data to the slave stations and command data for controlling an optical output of the slave stations. FIG. 12(b) represents the transmission format when the signal is sent from the slave stations to the master station, wherein the data information is divided into an input data and a status data indicating the received amount of light or the like.

The main difference in structure of the slave station 31 shown in FIG. 11 from that shown in FIG. 7 is explained below. Specifically, a level signal d showing the received amount of light is taken out from the opto-electric converter 1, and the level of the signal is detected by a light intensity detector 32. Then, the signal is input to a status parallel-serial converter 33 and converted to a serial status signal e, and sent to the master station along with the serial input data. Newly provided there is a control code serial-parallel converter 34 which extracts a control signal f for controlling the optical output of the electro-optic converter 9 from the command information within the receiving data information.

The communicating state of the slave stations 31 with the master station 10 will be depicted with reference to FIG. 13. Although the communicating state in FIG. 13 is fundamentally equal to that of FIG. 10, this is the case where the obstacle 17 makes a tremendous hindrance to the slave station 31a with the coincidence of addresses. In this case, if the master station 10 is unable to normally or stably communicate with the slave station 31a, a command data shown in FIG. 12(a) is generated to raise the optical output of a slave station 31b near the slave station 31a, which is extracted by the control code serial-parallel converter 34. If the normal operation is possible, the shortage of the amount of light is informed to the master station in a manner that the level of light of the slave station 31a is detected by the light intensity detector 32 and sent to the master station after being converted to serial status information by the status parallel-serial converter 33. Likewise, the other slave stations 31 transmit their own received level of light to the master station, or adjust the generated amount of light by themselves, so that the received amount of light of all of the slave stations is always kept constant and stable. As a consequence, even if a considerably large obstruction is present or the obstruction is moving time to time, a stable spatial transmission is ensured at all times.

However, if the infrared light is used for the optical transceiver in the above embodiment to avoid influences of the disturbance light, it is inconvenient that the projecting state of the infrared light is impossible to know. Therefore, according to a modified embodiment which will be described hereinbelow with reference to FIG. 14, a visible parallel beam is utilized as a marker to indicate the projecting direction.

Figure 14:
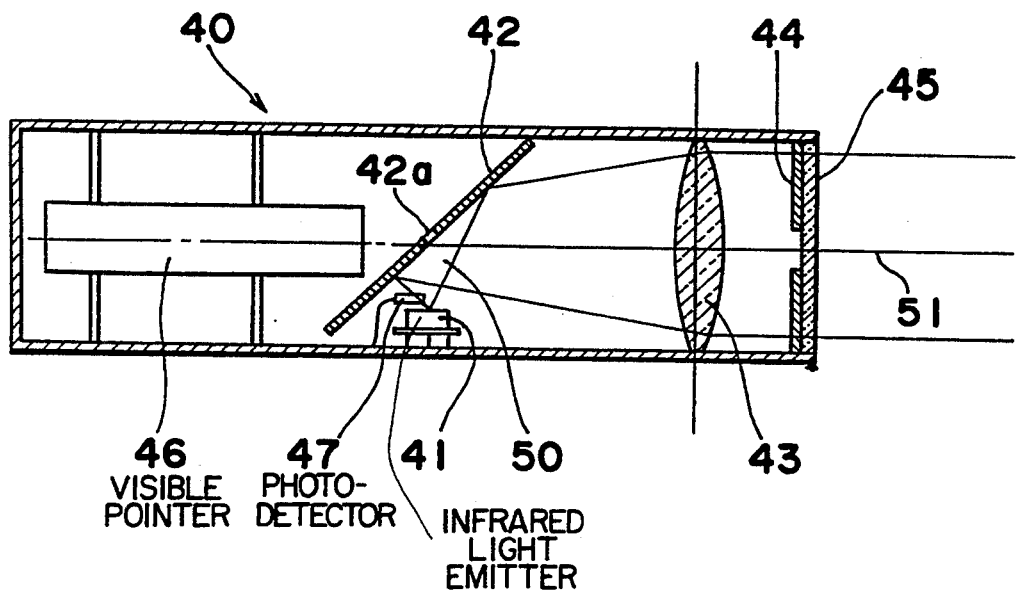
FIG. 14 is a cross-sectional view showing the structure of a transceiver means in the fourth embodiment.
Figure 15:
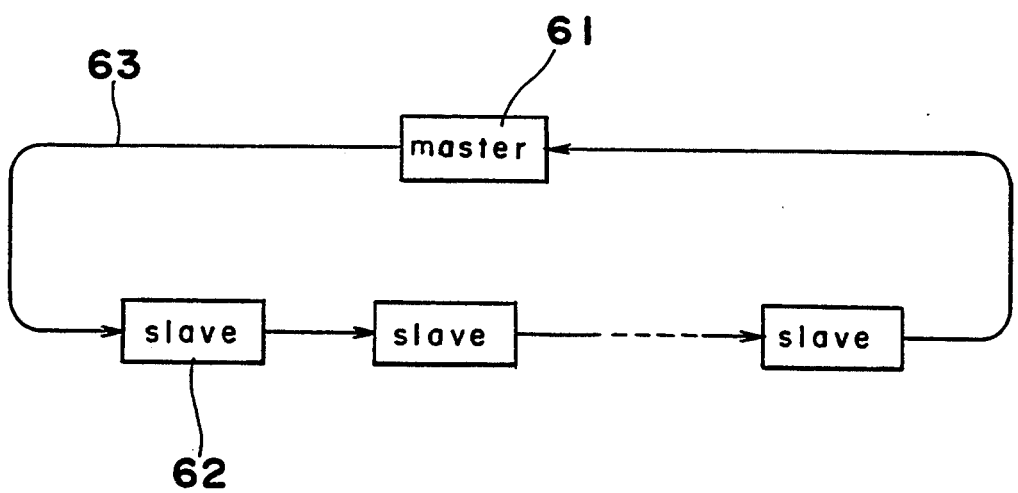
FIGS. 15 and 16 are structural diagrams of conventional examples of optical bus transmission systems.
Figure 16:
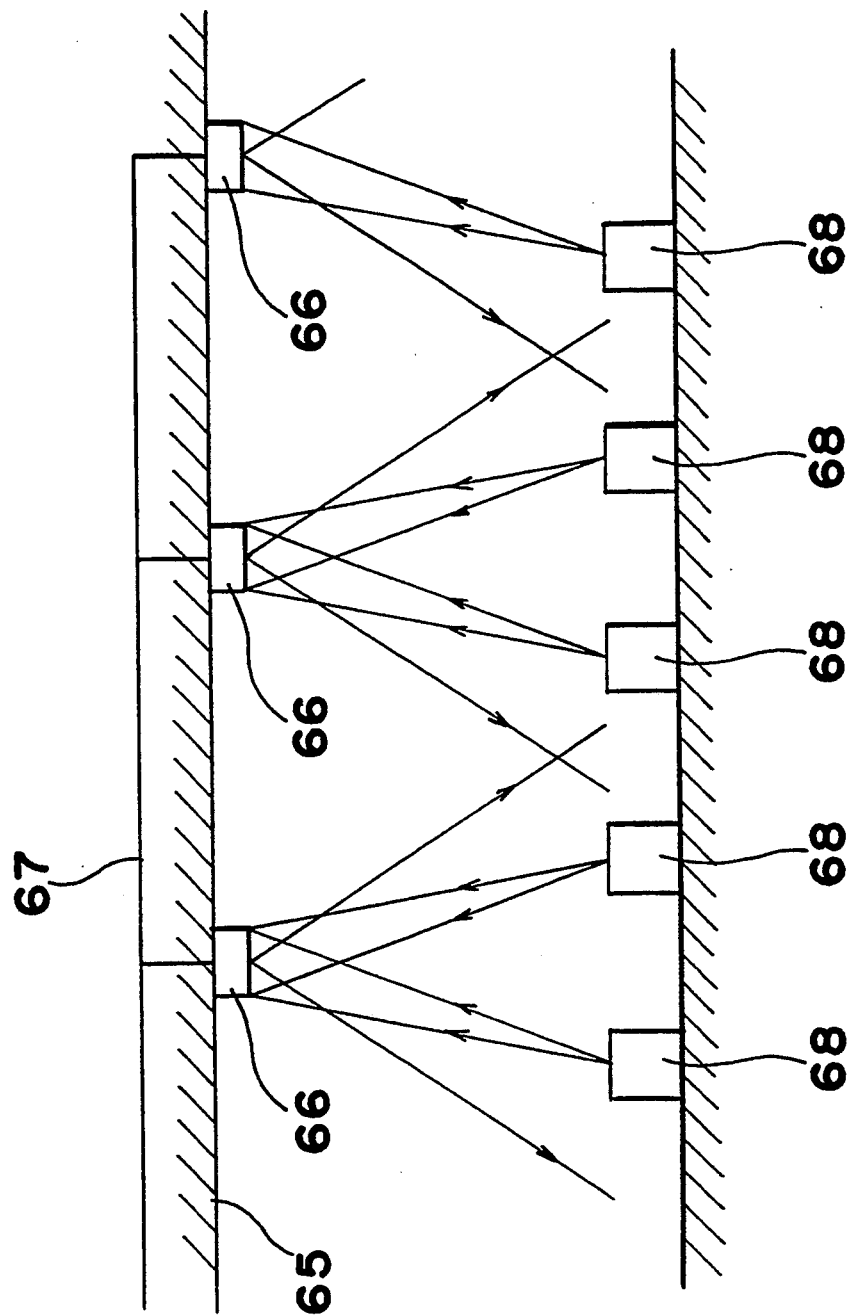

Referring to FIG. 14, in an optical transceiver 40, an infrared light 50 projected from an infrared light emitting element 41 is reflected by a reflecting plate 42, turned to be a parallel beam by a lens 43, and output through a transparent body 45. A visible filter 44 is attached to the transparent body 45. A visible beam 51 projected from a visible pointer 46 is, passing through a hole 42a formed at the center of the reflecting plate 42 and the transparent body 45 where the visible filter 44 is not attached, projected outside as a guide light of infrared beam. On the other hand, the visible light of the receiving infrared light is cut by the visible filter 44, condensed by the lens 43, reflected by the reflecting plate 42 and received by a photodetecting element 47 provided in the vicinity of the infrared light emitting element 41 to be output as an electrical signal.

In the above constitution, it can be easily detected by a single optical system which of the slave stations is communicating with the master station, while the disturbances of the visible light are suppressed.

Each of the foregoing embodiments can to exert the same effects as noted above in any of the following conditions. That is, the number of addresses and data can be set as desired in the transmission format. Since the slave stations 11 in the communicating states of FIGS. 4-6 need no relay function, it may be so arranged that only the slave station with the coincidence of addresses performs transmission of the data. Further, although the data information in the transmission format of FIG. 2 includes an output data and an input data altogether so as to shorten the transmission time, it may be divided in a manner as illustrated in FIG. 8. The order of the output data and command data in the transmission format in FIG. 12 may be reversed, and that of the input data and status data may also be changed. In addition, although the beam splitters 13 are arranged on the same straight line in FIG. 5, the optical path may be varied by use of a reflecting plate. The command data and status data may represent the other kinds of information than the amount of light.

As described hereinabove, the present invention enables a stable and direct transmission of data in space without using a transmission medium such as an optical fiber, etc. Therefore, it is made easy and free to increase or decrease the number of slave stations or to change the layout. Moreover, the present invention realizes a correct transmission of data from a selected slave station without interference from the other slave stations as long as the addresses are not duplicated among the slave stations. Accordingly, a stable optical bus transmission is carried out in real time.

By arranging the optical signal to be transmitted on a predetermined optical axis from the master station, and providing the beam splitters corresponding to each slave station, a long-distance spatial transmission is achieved.

If a plurality of transceiver means are provided in the master station, a stable transmission becomes possible even with an obstacle in the way.

Furthermore, if each slave station is equipped with a relay function and the optical transmission time is controlled among the information bits to generate a vacant time between the slave stations, a stable transmission is enabled by a single master station even with an obstacle in the way and without interference between the slave stations.

Besides, if the receiving or generating level of the light from the slave stations is controlled by the command data from the master station, a stable transmission is realized even if a serious obstacle is present.

If a visible light is generated in parallel to the optical signal, the transmission state can be confirmed easily at low cost while using an optical system therefor in common.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An optical bus transmission system for transmitting data between a master station and a plurality of slave stations by means of an optical bus;
    said master station being provided with a means for transmitting a serial optical signal in a transmission format consisting of a synchronizing signal, address information and data information comprising an output data part and an input data part;
    each of said slave stations being provided with: a means for serial to parallel converting the serial signal received from said master station; a means for parallel to serial converting serial input data information stored in said slave station; a detecting means for detecting a coincidence of an address set previously in said slave station with the received address information from the master station; a transmitting means for transmitting a serial optical signal at least partially corresponding to the received serial signal; a switching means for switching said transmitting means so that said input data information is transmitted as the input data part of the data information in the transmission format of the transmitted serial optical signal from said slave station when a coincidence of addresses is detected, and the received serial signal is transmitted as the transmitted serial optical signal in the absence of a detection of a coincidence of addresses;

and said transmitting means includes a means for controlling an optical transmission time of information bits so as to generate a vacant transmission time among the slave stations.

2. An optical bus transmission system according to claim 1, further comprising a means for using the data information in the transmission format as a command data part or a status data part, and a means included within said transmitting means for transmitting the level of the received amount of light as status information to the master station, and a control means for controlling the level of the received amount of light according to command information from the master station.

3. An optical bus transmission system according to claim 2, wherein each of said transmitting means further comprises an emitting/reeving means for emitting and receiving infrared light and an emitting means for emitting visible light, wherein the infrared light and visible light are generated by said emitting/receiving means and said emitting means with their optical axis in parallel.

4. An optical bus transmission system according to claim 1, wherein each of said transmitting means further comprises an emitting/reeving means for emitting and receiving infrared light and an emitting means for emitting visible light, wherein the infrared light and visible light are generated by said emitting/receiving means and said emitting means with their optical axis in parallel.

5. An optical bus transmission system for transmitting data between a master station and a plurality of slave stations by means of an optical bus; said master station being provided with a means for transmitting a serial optical signal in a transmission format consisting of a synchronizing signal, address information and data information; each of said slave stations being provided with: a means for serial to parallel converting the serial signal received from said master station; a means for parallel to serial converting serial input data information stored in said slave station; a detecting means for detecting a coincidence between an address previously set in said slave station and the received address information from the master station; a transmitting means for transmitting a serial optical signal at least partially corresponding to the received serial signal, and a switching means for switching said transmitting means so that said input data information is transmitted as the data information in the transmission format of the transmitted serial optical signal from said slave station when a coincidence of addresses is detected, and at least said input data information is inhibited from being transmitted in the absence of a detection of a coincidence of addresses; wherein said master station is provided with a plurality of optical transceiver means; wherein each of said transmitting means further comprises an emitting/receiving means for emitting and receiving infrared light and an emitting means for emitting visible light, wherein the infrared light and visible light are generated by said emitting/receiving means and said emitting means with their optical axis in parallel.

6. An optical bus transmission system for transmitting data between a master station and a plurality of slave stations by means of an optical bus; said master station being provided with a means for transmitting a serial optical signal in a transmission format consisting of a synchronizing signal, address information and data information; each of said slave stations being provided with: a means for serial to parallel converting the serial signal received from said master station; a means for parallel to serial converting serial input data information stored in said slave station; a detecting means for detecting a coincidence between an address previously set in said slave station and the received address information from the master station; a transmitting means for transmitting a serial optical signal at least partially corresponding to the received serial signal, and a switching means for switching said transmitting means so that said input data information is transmitted as the data information in the transmission format of the transmitted serial optical signal from said slave station when a coincidence of addresses is detected, and at least said input data information is inhibited from being transmitted in the absence of a detection of a coincidence of addresses; wherein said master station is further provided with at least one transceiver means for transmitting said serial optical signal onto a predetermined optical axis, with beam splitters arranged on said optical axis to diverse said serial optical signal to each of said slave stations; wherein each of said transmitting means further comprises an emitting/reeving means for emitting and receiving infrared light and an emitting means for emitting visible light, wherein the infrared light and visible light are generated by said emitting/receiving means and said emitting means with their optical axis in parallel.

* * * * *